March 3, 1953     E. R. MANN ET AL     2,630,529
TACHOMETER
Filed Feb. 23, 1950     3 Sheets-Sheet 1
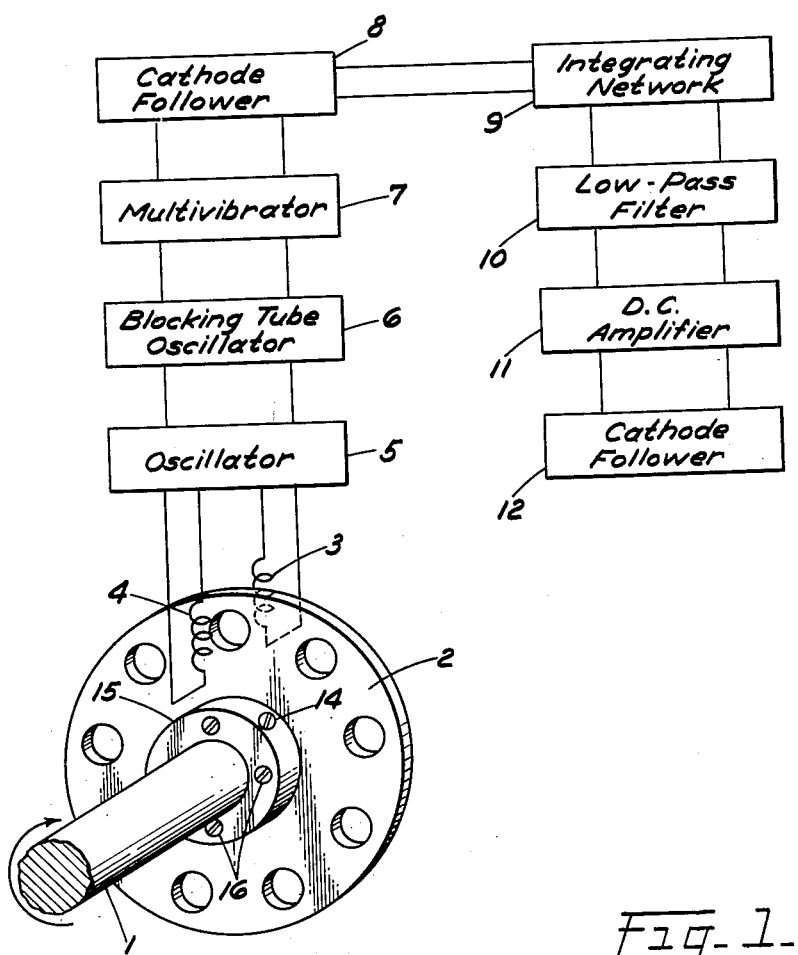
Fig-1-
INVENTORS
Robert G. Hester &
BY Estle R. Mann
Roland A. Anderson
ATTORNEY

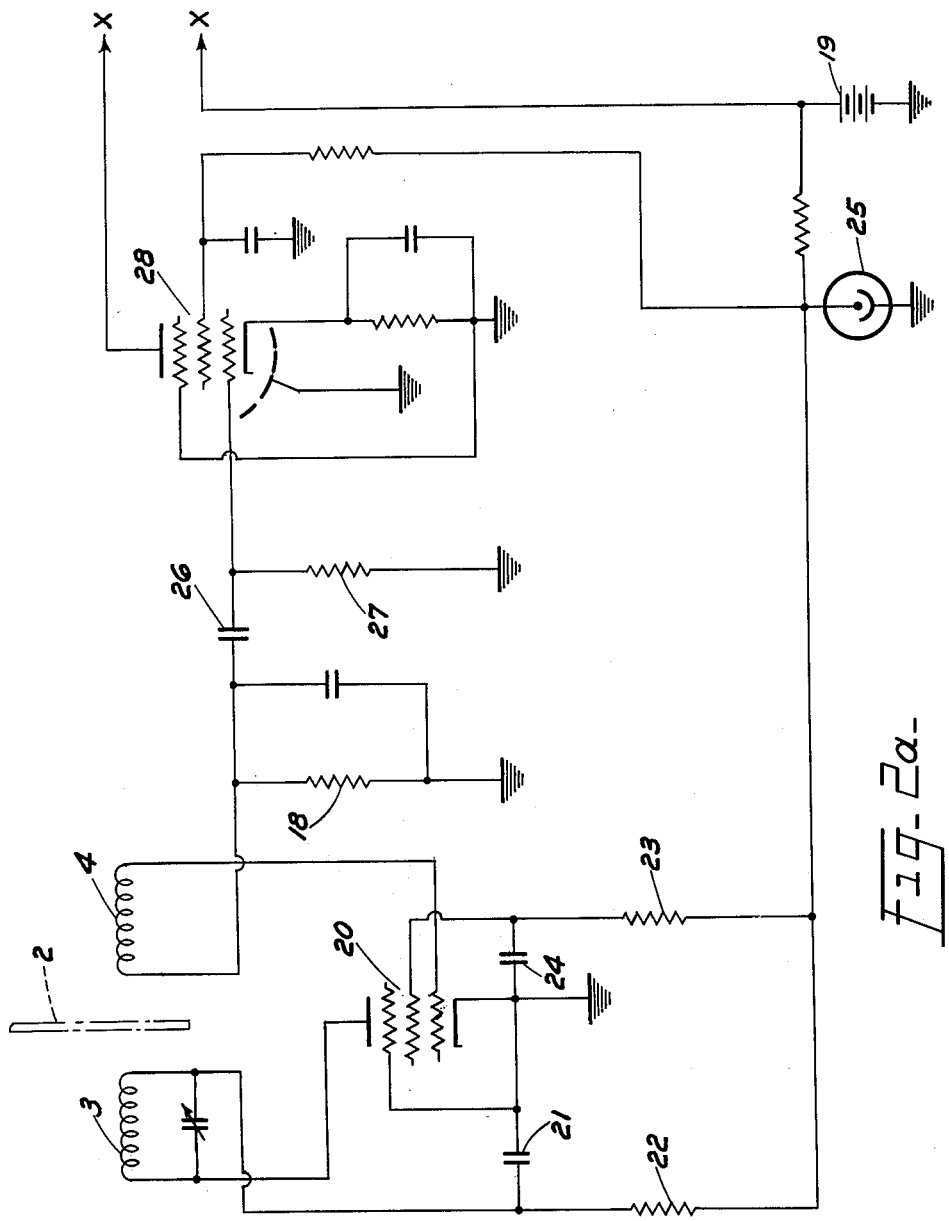

March 3, 1953  E. R. MANN ET AL  2,630,529
TACHOMETER
Filed Feb. 23, 1950  3 Sheets-Sheet 3

INVENTORS
Robert G. Hester &
BY Estle R. Mann
Roland A. Anderson
ATTORNEY

Patented Mar. 3, 1953

2,630,529

UNITED STATES PATENT OFFICE 2,630,529

TACHOMETER

Estle R. Mann and Robert G. Hester, Oak Ridge, Tenn., assignors to the United States of America as represented by the United States Atomic Energy Commission Application February 23, 1950, Serial No. 145,874

4 Claims. (Cl. 250—27)

The present invention relates to tachometers, and especially to mechanical-electronic devices adapted to produce an output voltage proportional to the speed of a rotating shaft or the like. Devices for determining the angular speed of a rotating shaft have been used satisfactorily when precision requirements are not too severe. One such device is a tachometer generator in which the rotor of an electrical D. C. or A. C. generator is geared to the rotating shaft whose angular speed is to be determined. The E. M. F. produced by this generator is, for all practical purposes, proportional to the speed of the rotor over a considerable range of speeds.

The tachometer generator which provides a D. C. output has an inherent weakness in the brush contacts. These contacts frequently are noisy and at high speeds may from time to time introduce an open circuit in the measuring device. A. C. tachometer generators provide outputs both amplitude variant and frequency variant with changing speeds of the rotor.

The strobotac provides a device for determining the speed of the rotating shaft. Without considerable modification, the information provided by the strobotac cannot be readily converted into a useful voltage or current for use in control instrumentation.

Devices using a fixed light source, a rotating slotted plate, and a photocell have been employed satisfactorily, when the shaft speed range is small, to generate an alternating current, the frequency of which is proportional to the rate of rotation of the plate. But such generators are entirely unsuitable for monitoring speeds over a wide range, because the amplitude of the photocell current is directly responsive to the time the light may be seen by the cell, and therefore responsive to the speed of the rotating slot. Thus for low speeds a large photocurrent may flow as each slot passes the cell, but as the speed increases, smaller and smaller currents will flow, making the conversion of such currents to a voltage proportional to the said speed, over wide ranges, exceedingly difficult, if not impossible.

Another factor discouraging utilization of photocells is that the cell current, plotted against time, rises in a bell shaped curve, since a small current begins to flow immediately on opening the slot. For precision and accuracy, a device is needed which produces pulses having a more sharply-defined, steeper wave front.

The problem of counting and at the same time providing a continuous voltage or current accurately proportional at the counting rate for control instrumentation is difficult. This has been true in the past largely because any method of counting provides a series of discreet pulses, and converting this series of discreet pulses into a continuous usable voltage or current for control instrumentation has been an extremely complicated task.

Accordingly, with a knowledge of the disadvantages and limitation inherent in the devices known to the art, we have as a primary object of our invention the provision of a tachometer adapted to produce a signal voltage proportional to the speed of a rotating member.

Another object of our invention is the provision of a mechanical-electronic system for producing an electrical potential proportional to the rate of rotation of a shaft, disc, or the like.

Still another object of our invention is the provision of a device adapted to produce a series of electrical pulses responsive to the rate of rotation of an external member and additional electrical means for producing a voltage proportional to the repetition rate of said pulses.

Other objects and advantages of our invention will become apparent from the description of a preferred embodiment thereof, when read in conjunction with the appended drawings, in which:

Fig. 1 illustrates a preferred means for generating electrical pulses at a frequency responsive to the speed of a rotating member, and shows the interrelation and connection of a rotatable metal member with associated electrical circuits, which are represented schematically.

Fig. 2a illustrates in detail a preferred embodiment of an electronic oscillator, differentiating circuit, and associated amplifier, represented schematically by the block 5 in Fig. 1.

Figure 2B:
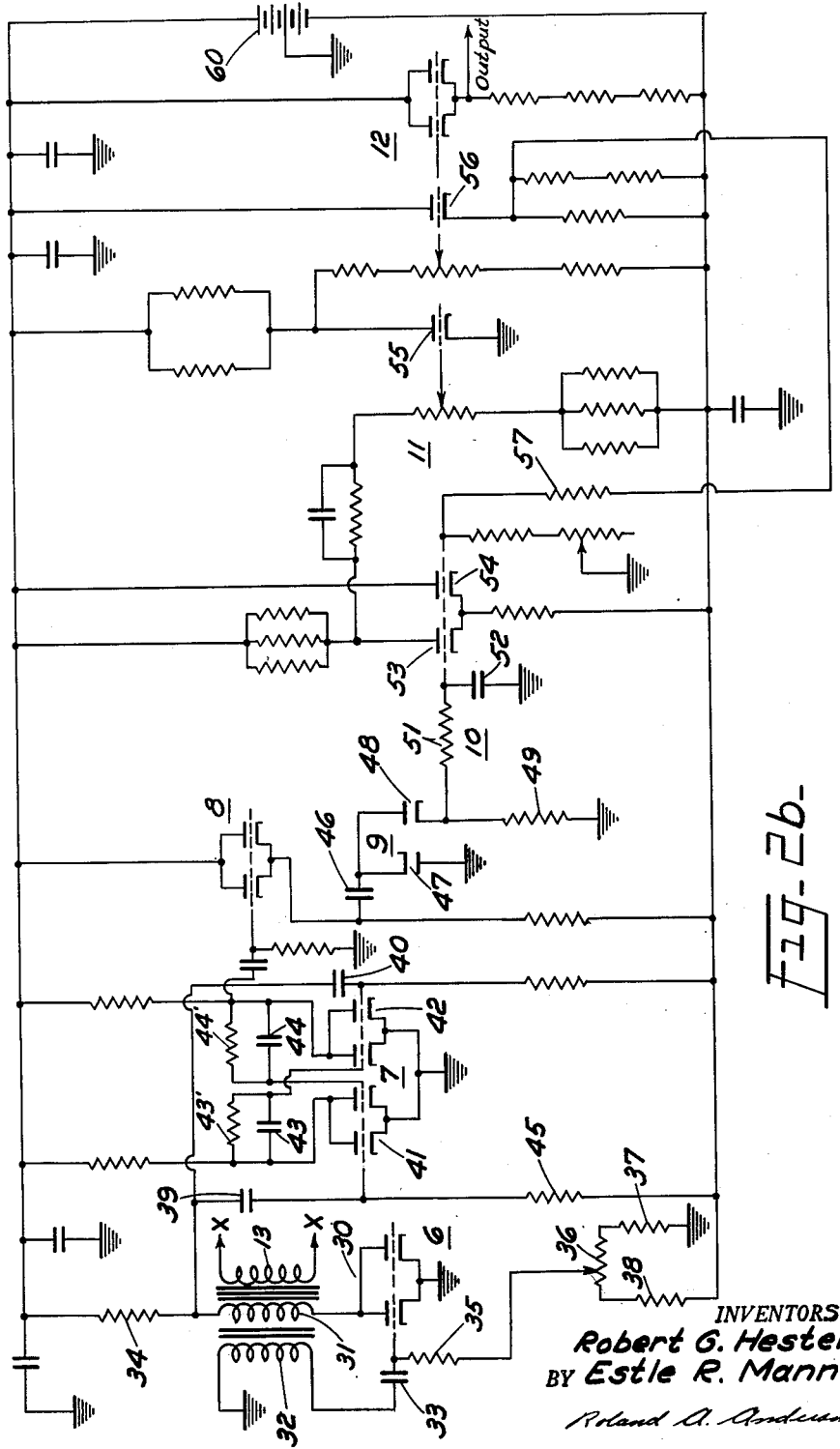
Fig. 2b illustrates in detail a preferred embodiment of the remainder of the electrical networks shown schematically in Fig. 1, the points of interconnection between Figs. 2a and 2b being denoted by the letters X, X.

In accordance with the broad principles of our invention, we provide an electronic circuit adapted to produce oscillations, means coupled to a rotating member and turning in response thereto for determining the repetition rate of the oscillations, and an electronic circuit interrelated with the oscillating circuit for producing a D. C. voltage very accurately proportional to that repetition rate.

A generalized analysis of the counting type tachometer shows that whatever device one uses to utilize discreet pulses in providing a continuous control signal must of necessity require a finite interval of time whose extent contains the occurrence of several counting pulses. A reasonably dependable continuous control signal may be obtained by a device which uses as few as ten consecutive pulses to compute an average rate at which the pulses are made. A similar device could provide with the same accuracy a usable signal in $\frac{1}{10}$ the time interval if the pulses were occurring ten times the rate originally considered. In practice a sufficiently satisfactory number of pulses required for averaging may be somewhere between 10 and 100 pulses per interval over which the average is to be made.

In accordance with the principles of the present invention, means for producing pulses is described wherein the design engineer may choose to have pulses at the rate of one pulse per revolution of the shaft, ten pulses per revolution, 100 pulses, or, for that matter, as many as is deemed desirable to provide the required precision and the maximum time interval over which the averaging can be done. As the number of pulses per revolution increases, the average speed, as determined by the average rate at which the pulses occur, approaches closer and closer to the instantaneous speed, since the instantaneous speed by definition is the limit of the average as the averaging interval approaches zero and the repetition rate of the pulses becomes positively infinite.

Referring now to Fig. 1, the rotation of the shaft 1, the speed of which we wish to measure, may be converted into a train of pulses by means of an electrically conductive rotor 2, which may be a disc of copper, brass, or other good electromagnetic shielding material, and which has a series of apertures evenly spaced around its perimeter. The rotor may be coupled to the shaft in any convenient manner, such as by set screws 14 extending through flanged sleeve 15, secured to the disc by screws 16. When an aperture in the rotor 2 is turned by the shaft to a certain point, the primary and secondary of a pair of coils 3, 4, previously shielded from each other by the conductor 2, are coupled together through the hole. This causes a radio frequency oscillation to occur, since the two coils are connected in an oscillator type circuit 5. This oscillation will continue as long as the aperture is between the coils. After the hole has moved on, the oscillation will stop, since there is no longer any magnetic coupling between the two coils when the conductive rotor 2 is between the coils to prevent magnetic lines of force in the primary coil from reaching the secondary coil. We have found that the above-described coupling of energy, plotted vs. time, rises very rapidly to a peak, and that peak occurs at substantially the same relative position for each equal-sized aperture, giving fast, equal-amplitude, sharply-defined signal impulses.

The signal that we use from this oscillator is the voltage drop which occurs across the grid circuit resistor in the oscillator 5 as long as the circuit is oscillating. As soon as oscillation stops the voltage drop disappears.

Since we are only interested in the starting instants of oscillations, an R.-C. type of derivative generator circuit is used on the output of the signal just mentioned; and the output of this circuit is amplified and used to fire a blocking tube oscillator 6, which creates pulses of equal amplitude and energy.

These pulses are used to trigger multivibrator circuit 7, which produces rectangular pulses, each separated by an interval determined by the oscillation repetition rate, and inversely proportional to the speed of rotation. These rectangular pulses may be then put through a cathode follower 8, which has a low output impedance, and fed to integrating circuit 9.

The output of the integrating circuit is composed of two components: A D. C. component which we desire as a measure of the shaft speed; and a pulse component which is the derivative of the positive edge of the square wave generator, which we may or may not desire. The output of the integrating circuit may be put through a low pass filter circuit 10 which removes the pulse component and leaves the D. C. component which is proportional to the shaft speed.

If this D. C. voltage be too low a value for our control circuit, a direct coupled amplifier 11 may be added which brings the maximum output voltage, which corresponds to maximum shaft speed, up to any desired value, and isolating cathode follower 12 may be provided to furnish a low impedance output.

Referring now to Figs. 2a and 2b, preferred embodiments of the elements set forth on block diagrams in Fig. 1 are illustrated in detail.

Although the circuit elements and components described constitute a preferred form of our invention, it is apparent that modifications of the circuits employed and changes in the components illustrated might be made by those skilled in the art without departing from the spirit of the invention. Accordingly, the following description of the electronic components of our invention is intended for purposes of illustration only, and is not to be construed in a limiting sense.

The coils 3, 4 may be small radio-frequency type coils, handwound on any suitable form. One satisfactory coil comprises 20 turns of #30 magnet wire on a polystyrene form $\frac{1}{4}''$ in diameter. It will be apparent that for greater accuracy and higher shaft speeds, coils of higher frequency must be provided to insure complete decay of one oscillation before the next one is actuated. The coils should be disposed close together to provide proper coupling, and may, for example, be $\frac{3}{16}''$ apart.

The preferred oscillator circuit 5 comprises pentode 20, coils 3, 4, feedback condenser 21, load resistor 22, screen-grid voltage dropping resistor 23, and smoothing capacitor 24, connected across voltage source 19, regulated by the tube 25 to 150 volts. During oscillation, grid current is drawn, resulting in a current flow through resistor 18 and a voltage drop thereacross. The voltage is differentiated in the resistance-capacitance network 26, 27, and fed to conventional amplifier stage 28, which delivers pulses of energy to trigger winding 13.

The blocking oscillator 6 may comprise a duo-triode 30 with its corresponding elements interconnected, plate winding 31, grid winding 32, trigger winding 13, coupling condenser 33, load resistor 34, and grid biasing resistors 35, 36, 37, 38. The oscillator may be energized by a 600 volt regulated power supply, represented for clarity by battery 60. In operation, brief triggering pulses of energy applied to coil 13 are coupled through coil 32 and condenser 33 to the grid of the oscillator as positive pulses, causing negative pulses, all of equal amplitude and energy, to appear across coupling condensers 39, 40.

The rectangular wave generating circuit 7 may utilize a pair of duo-triodes 41, 42, the grids of each being coupled to the plate of the other duo-triode through a parallel resistor-condenser network, in the familiar multivibrator connection. If tube 41 be conducting and tube 42 be cut off, a negative pulse from oscillator 6 through condensers 39, 40, will cause tube 41 to stop conducting, and the plate potential of the tube will rise. The sudden rise of plate potential is coupled to the grid of tube 42 through condenser 43 and resistor 43', causing that tube to conduct, suddenly lowering its plate potential. The sudden drop in plate potential is coupled back to the grids of tube 41 through resistor 44' and condenser 44 and maintains them below cut-off potential. The following negative pulse will drive the grids of tube 42 negative, causing a sudden rise in its plate potential. That rise is coupled to the grids of tube 41 and raises their potential above cut-off. As tube 41 conducts, its plate potential falls sharply, driving the grids of tube 42 below cut-off and maintaining them in that condition.

The cathode follower 8 comprises an interconnected duo-triode for coupling the square waves produced by the multivibrator through condenser 46 to the asymmetrically connected diodes 47, 48, and resistor 49, which form the pulse-integrating network 9. Since diode 48 conducts only as long as its anode is positive, and since the anode goes positive only for the duration of the transient which occurs across condenser 46 when tube 8 receives a positive pulse, the average D. C. potential across resistor 49 will be proportional to the number of pulses per unit time, hence to the oscillation repetition rate.

Resistor 51 and condenser 52 may comprise the simple low-pass filter 10, or other more elaborate filters known in the art my be utilized to accomplish the removal of the undesired pulse component of the potential across resistor 49.

The direct-coupled amplifier 11 may include three stages: cathode-coupled triodes 53, 54, triode 55, and triode 56. The potential appearing at the cathode of the last stage, (tube 56), is fed back to the grid of triode 54 through resistor 57, for greater stability. The grid of triode 56 is coupled directly to the cathode follower 12, which may be a duo-triode having like elements connected together.

Although the voltage supplies are shown as batteries 19, 60, for clarity, well-regulated electronic power supplies will likely be preferred. Such power supplies are well-known in the art, and form no part of the present invention. Likewise, the heater connections for the tubes illustrated in the figures have been omitted for clarity, each tube except diodes 47, 48 being connected as prescribed by the manufacturer, and a source of heater power of any conventional design being suitable. The diodes may preferably be operated at reduced heater voltages of 3.9 V. A. C., by inserting a 10 ohm, 1 watt resistor in series with their heaters.

We claim:

1. In a tachometer including an electronic tube oscillator and means for periodically interrupting oscillation of said oscillator at a frequency proportional to the speed to be measured, the improvement which comprises means for deriving a series of timing pulses from the grid circuit of said oscillator, means for generating a corresponding series of pulses characterized by uniform magnitude and rise time, means responsive to said uniform pulses for generating a corresponding series of substantially rectangular, uniform pulses, and means for producing a voltage proportional to the frequency of repetition thereof.

2. In a tachometer including an electronic tube oscillator, means for periodically interrupting oscillation of said oscillator at a frequency proportional to the speed to be measured, a pulse integrating network, and a filter network coupled thereto to attenuate pulsating voltage fluctuations therein, the improvement which comprises means for deriving a series of timing pulses from said oscillator including a resistance-capacitance derivative generator network, a blocking oscillator arranged to be triggered by each of said timing pulses, and a multivibrator network arranged to be triggered by each pulse from said blocking oscillator and to deliver pulses of uniform, substantially rectangular waveform to said integrating network.

3. In an improved tachometer operable over a wide range of speeds including a first oscillator and means for interrupting the oscillations thereof at a frequency proportional to the speed to be measured, the improvement comprising a coil and a resistor connected in series with the control grid of said oscillator, means for amplifying the voltage drops which occur across said resistor during said oscillations, and a blocking-tube oscillator arranged to be triggered by each of said amplified voltage drops to produce a series of uniform output pulses for each triggering voltage signal, a wave generator circuit arranged to be triggered by each of said output pulses to produce a single, substantially rectangular wave corresponding to each pulse, capacitance means connected to receive said rectangular waves, and means for deriving an output signal voltage from said capacitance.

4. A tachometer accurate over a wide range of speeds comprising a first oscillator having grid and plate circuits associated therewith, differentiating circuit means connected in said grid circuit, means for amplifying the signals from said differentiating circuit, a second oscillator connected to receive said amplified signals and to produce a series of uniform pulses therefrom, a multivibrator network having two stable states connected to receive said uniform pulses and to be triggered thereby from one state to the other, a cathode follower circuit coupled to said multivibrator to receive uniform pulses therefrom, an integrating network including a storage capacitor connected to receive signals from said follower circuit and to produce a direct voltage output, and means for amplifying the direct voltage output and delivering it to a load.

ESTLE R. MANN.
ROBERT G. HESTER.

REFERENCES CITED

The following references are of record in the file of this patent:

UNITED STATES PATENTS

| Number | Name | Date |
|---|---|---|
| 2,260,933 | Cooper | Oct. 28, 1941 |
| 2,325,927 | Wilbur | Aug. 3, 1943 |
| 2,467,777 | Rajchnan | Apr. 19, 1949 |
| 2,524,710 | Miller | Oct. 3, 1950 |